(12) United States Patent
Miyasaka et al.

(10) Patent No.: US 10,562,196 B2
(45) Date of Patent: Feb. 18, 2020

(54) ROBOT, CONTROL DEVICE, AND ROBOT SYSTEM

(71) Applicant: Seiko Epson Corporation, Tokyo (JP)

(72) Inventors: Hidekatsu Miyasaka, Matsumoto (JP); Sho Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 359 days.

(21) Appl. No.: 15/635,613

(22) Filed: Jun. 28, 2017

(65) Prior Publication Data

US 2018/0001487 A1 Jan. 4, 2018

(30) Foreign Application Priority Data

Jun. 29, 2016 (JP) ................................ 2016-129272

(51) Int. Cl.
*B25J 19/00* (2006.01)
*B25J 9/12* (2006.01)
*B25J 18/04* (2006.01)

(52) U.S. Cl.
CPC ........... *B25J 19/0029* (2013.01); *B25J 9/126* (2013.01); *B25J 18/04* (2013.01)

(58) Field of Classification Search
CPC ......... B25J 19/0029; B25J 9/126; B25J 18/04
See application file for complete search history.

(56) References Cited

U.S. PATENT DOCUMENTS

| 8,720,296 | B2* | 5/2014 | Yonehara | ................. | B25J 9/046 74/490.02 |
| 9,579,806 | B2* | 2/2017 | Sussman | .............. | B25J 19/0025 |
| 9,796,097 | B2* | 10/2017 | Kirihara | .................... | B25J 17/02 |
| 9,845,785 | B2* | 12/2017 | Vigars | ................... | F03B 13/264 |
| 9,975,239 | B2* | 5/2018 | Kinoshita | .............. | B25J 9/0027 |
| 10,093,024 | B2* | 10/2018 | Inoue | .................. | B25J 19/0025 |
| 10,099,367 | B2* | 10/2018 | Hirabayashi | ............... | B25J 9/12 |
| 10,293,479 | B2* | 5/2019 | Yoshimura | ............... | B25J 9/047 |
| 2010/0313694 | A1 | 12/2010 | Aoki | | |
| 2015/0068347 | A1 | 3/2015 | Kirihara et al. | | |
| 2016/0288335 | A1 | 10/2016 | Akaha et al. | | |
| 2016/0288336 | A1 | 10/2016 | Toshimitsu et al. | | |
| 2016/0288339 | A1 | 10/2016 | Akaha | | |
| 2016/0288340 | A1 | 10/2016 | Akaha et al. | | |
| 2016/0288341 | A1 | 10/2016 | Akaha | | |

(Continued)

FOREIGN PATENT DOCUMENTS

| JP | 2010-284777 A | 12/2010 |
| JP | 2015-054357 A | 3/2015 |

(Continued)

*Primary Examiner* — David M Fenstermacher
(74) *Attorney, Agent, or Firm* — Harness, Dickey & Pierce, P.L.C.

(57) ABSTRACT

In a robot, each of a first flexible member and a second flexible member has a portion fixed to an n-th arm, a portion that is fixed to an (n+1)-th arm, and a portion that is positioned between the n-th arm and the (n+1)-th arm and is wound around a member in a folded state. The portion of the first flexible member that is fixed to the n-th arm is positioned on the member side from the portion of the second flexible member that is fixed to the n-th arm. The portion of the second flexible member that is fixed to the (n+1)-th arm is positioned on the member side from the portion of the first flexible member that is fixed to the (n+1)-th arm.

20 Claims, 11 Drawing Sheets

(56) References Cited

U.S. PATENT DOCUMENTS

2016/0288342 A1  10/2016  Akaha
2016/0318180 A1  11/2016  Miyasaka

FOREIGN PATENT DOCUMENTS

| | | |
|---|---|---|
| JP | 2016-190293 A | 11/2016 |
| JP | 2016-190294 A | 11/2016 |
| JP | 2016-190295 A | 11/2016 |
| JP | 2016-190296 A | 11/2016 |
| JP | 2016-190297 A | 11/2016 |
| JP | 2016-190298 A | 11/2016 |
| JP | 2016-203344 A | 12/2016 |
| JP | 2016-203345 A | 12/2016 |

\* cited by examiner

ROBOT, CONTROL DEVICE, AND ROBOT SYSTEM

BACKGROUND

1. Technical Field

The present invention relates to a robot, a control device, and a robot system.

2. Related Art

In the related art, a robot that includes a robotic arm provided with a plurality of arms which are connected to one another, and an end effector such as a hand provided at a distal end of the robotic arm is known. Such a robot includes a plurality of wire clusters such as wiring through which power or the like for controlling, for example, drive of an arm and an end effector is transmitted. In layout of the wire clusters, in order to prevent the wiring from being brought into contact with the arm or peripheral devices, the wire clusters are accommodated inside the robot.

For example, in a robot disclosed in JP-A-2015-54357, wire clusters are disposed in a space formed between a power transmitting shaft and a power-transmitting-shaft outer cylinder provided over the outer circumference of the power transmitting shaft. In addition, in JP-A-2015-54357, the wire clusters are bent at a certain position and folded to have a U shape in a side view and are disposed in a space. In this manner, a load applied to the wire clusters due to the rotation of the power transmitting shaft is reduced and risk of breaking or abrasion of the wire clusters is reduced.

Here, in a case where a plurality of U-shaped wire clusters are disposed in the space, it is necessary to consider lengths of the wire clusters required due to the rotation of the power transmitting shaft. Specifically, the wire cluster positioned on the outer side needs to be longer in length than the wire cluster positioned on the inner side. However, when the plurality of wire clusters are bundled, normally, all of the wire clusters have the same length in general. When the plurality of U-shaped wire clusters having the same length are disposed in the space and the power transmitting shaft rotates, of the wire clusters, the wire cluster positioned on the inner side has a length longer than necessary and is bent, and the wire cluster positioned on the outer side has a length shorter than necessary and is under tension. Therefore, a problem arises in that the wire cluster on the inner side having the length longer than necessary and the wire cluster on the outer side having the length shorter than necessary interfere with each other, and thus it is not possible to smoothly move without interference of the wire clusters with each other. In addition, there is a possibility that the wire cluster on the inner side will be broken due to the bending and there is a possibility that the wire cluster on the outer side will be broken due to the tension.

SUMMARY

An advantage of some aspects of the invention is to solve at least a part of the problems described above, and the invention can be implemented by the following configurations.

A robot according to an aspect of the invention includes: an n-th arm (n is an integer of 1 or larger); an (n+1)-th arm that is rotatably provided on the n-th arm; a member provided between the n-th arm and the (n+1)-th arm; a first flexible member that has at least one of wiring and a tube cluster; and a second flexible member that has at least one of wiring and a tube cluster. Each of the first flexible member and the second flexible member has a portion fixed to the n-th arm, a portion fixed to the (n+1)-th arm, and a portion that is positioned between the n-th arm and the (n+1)-th arm and is wound around the member in a folded state. The portion of the first flexible member that is fixed to the n-th arm is positioned on the member side from the portion of the second flexible member that is fixed to the n-th arm. The portion of the second flexible member that is fixed to the (n+1)-th arm is positioned on the member side from the portion of the first flexible member that is fixed to the (n+1)-th arm.

According to the robot of the aspect of the invention, it is possible for the first flexible member and the second flexible member to have the same length which are needed when the (n+1)-th arm rotates by 180° with respect to the n-th arm. Therefore, for example, in a case where a cover member is provided on the outer circumference side of the member, it is possible for the first flexible member and the second flexible member to smoothly move without interference with each other even in a relatively narrow space between the member and the cover member. Therefore, it is possible to reduce a possibility that, of the first flexible member and the second flexible member, a flexible member having a length longer than necessary will be bent and will be broken, or a possibility that a flexible member having a length shorter than necessary will be under tension and will be broken.

It is preferable that the robot of the aspect of the invention further includes a bundle of flexible members that includes the first flexible member and the second flexible member, in which the bundle has a first fixed portion fixed to the n-th arm, a second fixed portion fixed to the (n+1)-th arm, and a folded portion that is positioned between the n-th arm and the (n+1)-th arm and is wound around the member in a folded state, and the bundle is twisted between the first fixed portion and the second fixed portion.

With this configuration, in a case where the bundle has a plurality of flexible members including the first flexible member and the second flexible member, it is possible for all of the flexible members to have substantially the same length, and it is possible for all of the flexible members to smoothly move without interference with each other.

In the robot of the aspect of the invention, it is preferable that the bundle of the flexible members is twisted in a range of 150° to 210°.

With this configuration, it is possible for the plurality of flexible members including the first flexible member and the second flexible member to smoothly move without interference with each other, and it is possible to reduce a possibility of breaking or the like of the plurality of flexible members.

In the robot of the aspect of the invention, it is preferable that the member is provided with an actuator that causes the (n+1)-th arm to rotate with respect to the n-th arm.

With this configuration, it is possible to dispose the bundle of flexible members on an outer circumferential portion of the member provided with the actuator that is capable of causing the (n+1)-th arm to rotate with respect to the n-th arm.

In the robot of the aspect of the invention, it is preferable that at least a part of the external appearance of the first flexible member and at least a part of the external appearance of the second flexible member are identifiable.

With this configuration, it is possible to easily know types of layout of the first flexible member and the second flexible member. In addition, it is possible to easily know that the bundle of flexible members is twisted.

In the robot of the aspect of the invention, it is preferable that a portion of the external appearance of the first flexible member that is fixed to the n-th arm and a portion of the external appearance of the second flexible member that is fixed to the n-th arm are identifiable, and a portion of the external appearance of the first flexible member that is fixed to the (n+1)-th arm and a portion of the external appearance of the second flexible member that is fixed to the (n+1)-th arm are identifiable.

With this configuration, it is possible to easily know the types of layout of the first flexible member and the second flexible member. Therefore, it is possible to easily know a state in which the portion of the first flexible member that is fixed to the n-th arm is positioned on the member side from a portion of the second flexible member that is fixed to the n-th arm, and the portion of the second flexible member that is fixed to the (n+1)-th arm is positioned on the member side from the portion of the first flexible member that is fixed to the (n+1)-th arm. In addition, it is possible to save time and effort taken to identify each of the entire first flexible member and the entire second flexible member, and thus the configuration is simplified.

In the robot of the aspect of the invention, it is preferable that at least one of the first flexible member and the second flexible member is provided with an identification mark for identifying the first flexible member and the second flexible member.

With this configuration, it is possible to easily distinguish visually between the first flexible member and the second flexible member by visually recognizing the identification mark. Therefore, it is possible to easily know that the first flexible member and the second flexible member are in the state.

In the robot of the aspect of the invention, it is preferable that the n-th arm is capable of rotating around the n-th rotation axis, the (n+1)-th arm is provided on the n-th arm so as to be capable of rotating around the (n+1)-th rotation axis having an axial direction which is different from an axial direction of the n-th rotation axis, and it is possible to overlap the n-th arm and the (n+1)-th arm, when viewed in the axial direction of the (n+1)-th rotation axis.

With this configuration, it is possible to reduce a space in which the robot is prevented from interference with each other. In addition, in the robot, in a state in which the n-th arm and the (n+1)-th arm overlap each other, when viewed in the axial direction of the (n+1)-th rotation axis, a space between the n-th arm and the (n+1)-th arm is relatively narrow. In the robot, when the first flexible member and the second flexible member are disposed as described above, it is particularly effective in that the first flexible member and the second flexible member smoothly move without interference with each other.

In the robot of the aspect of the invention, it is preferable that the n-th arm is longer than the (n+1)-th arm in length, when viewed in the axial direction of the (n+1)-th rotation axis.

With this configuration, it is possible to overlap the n-th arm and the (n+1)-th arm without interference with each other, when viewed in the axial direction of the (n+1)-th rotation axis.

It is preferable that the robot of the aspect of the invention further includes a base, in which the n-th arm (n is 1) is provided on the base.

With this configuration, it is possible for the n-th arm to rotate with respect to the base. In addition, when the first flexible member and the second flexible member are disposed as described above with respect to the member provided between the base and the n-th arm, it is possible for the first flexible member and the second flexible member to smoothly move without interference with each other even in the vicinity of the member. Therefore, it is possible to reduce a possibility of breaking or the like of the plurality of flexible members.

A control device according to an aspect of the invention controls actuation of the robot of the aspect of the invention.

According to the control device of the aspect of the invention, it is possible to sequentially control operations of the members of the robot in which the first flexible member and the second flexible member are disposed as described above, and it is possible to control operations of the robot with high accuracy.

A robot system according to an aspect of the invention includes: the robot of the aspect of the invention; and a control device that controls actuation operation of the robot.

According to the robot system of the aspect of the invention, since the first flexible member and the second flexible member are disposed as described above in the robot, it is possible for the first flexible member and the second flexible member to smoothly move. In addition, it is possible to reduce a possibility of breaking of the first flexible member and the second flexible member due to the bending or tension.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a control device, and a robot system according to the invention will be described in detail on the basis of exemplary embodiments illustrated in the accompanying figures.

Figure 1:
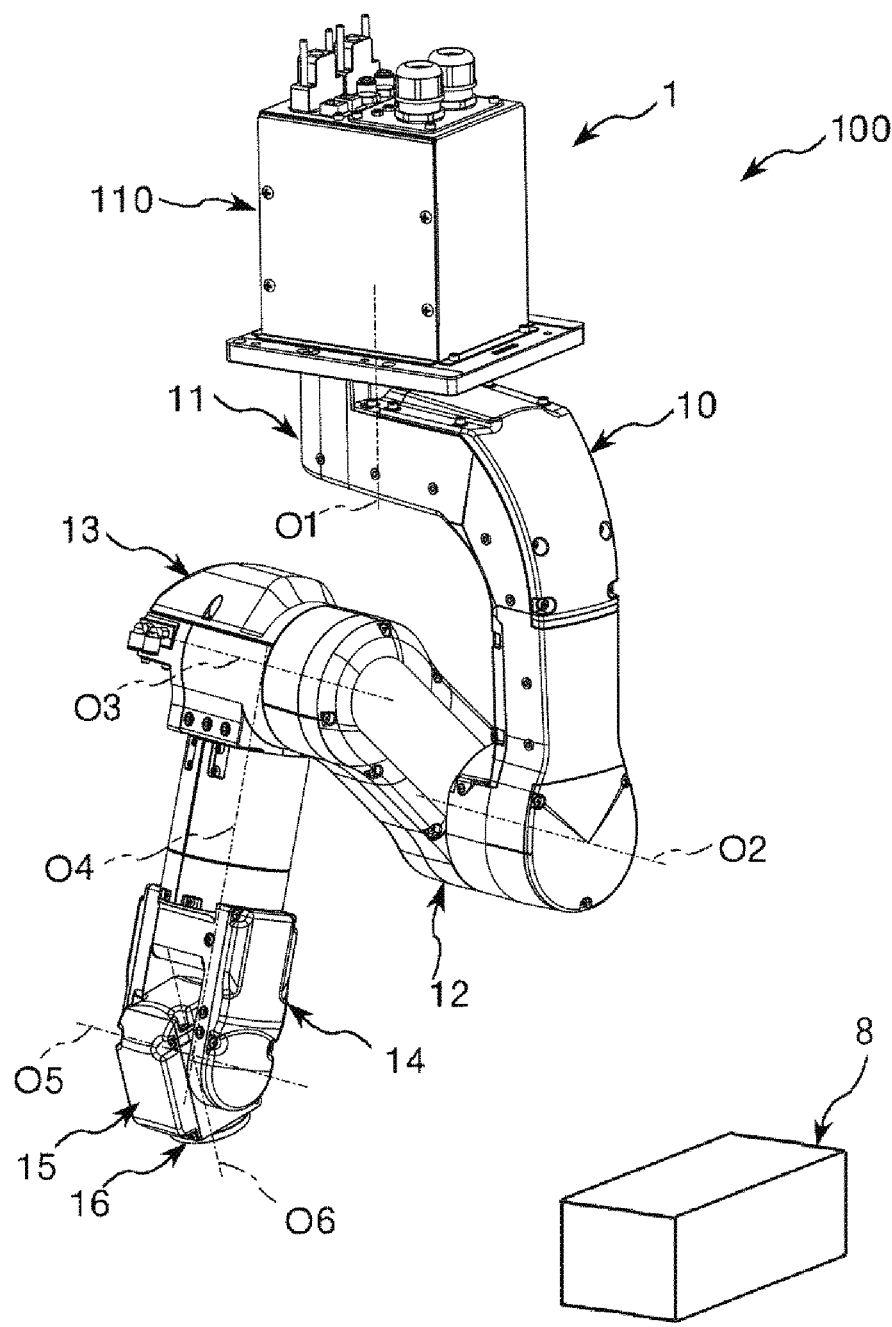
FIG. 1 is a perspective view illustrating a robot system according to a first embodiment of the invention.
Figure 2:
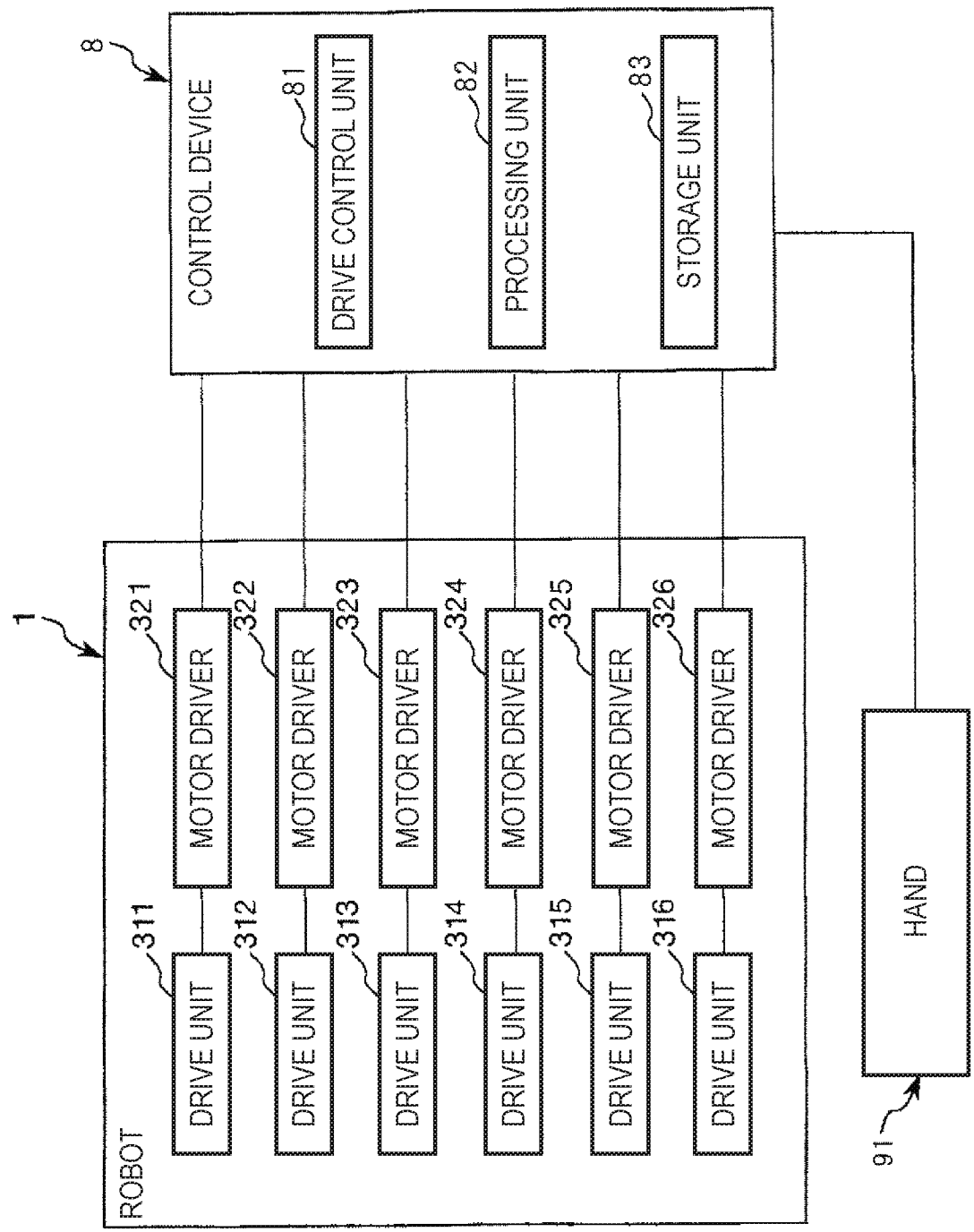
FIG. 2 is a block diagram of a configuration of a system of a robot and a control device illustrated in FIG. 1.
Figure 3:
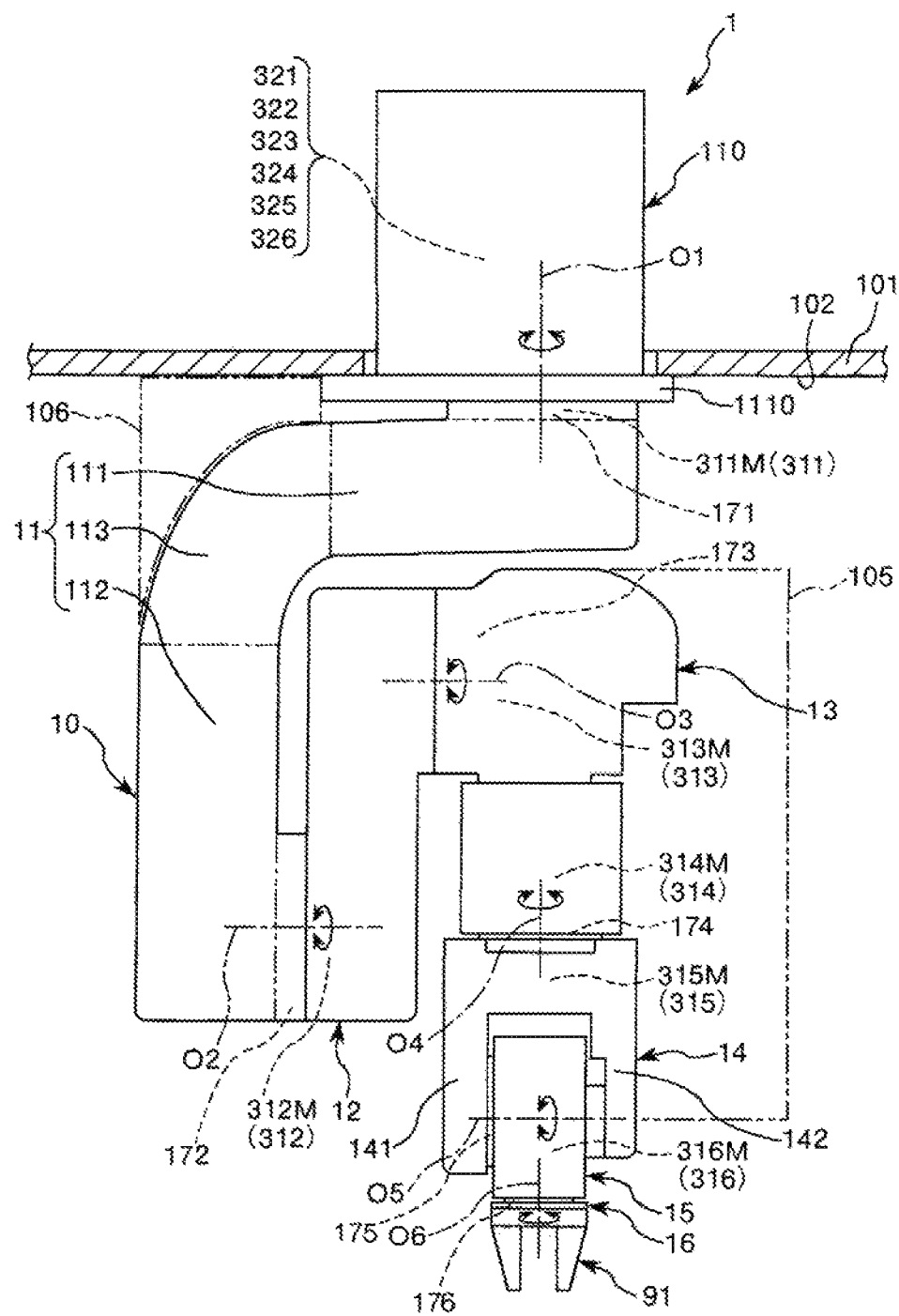
FIG. 3 is a front view of the robot illustrated in FIG. 1.
Figure 4:
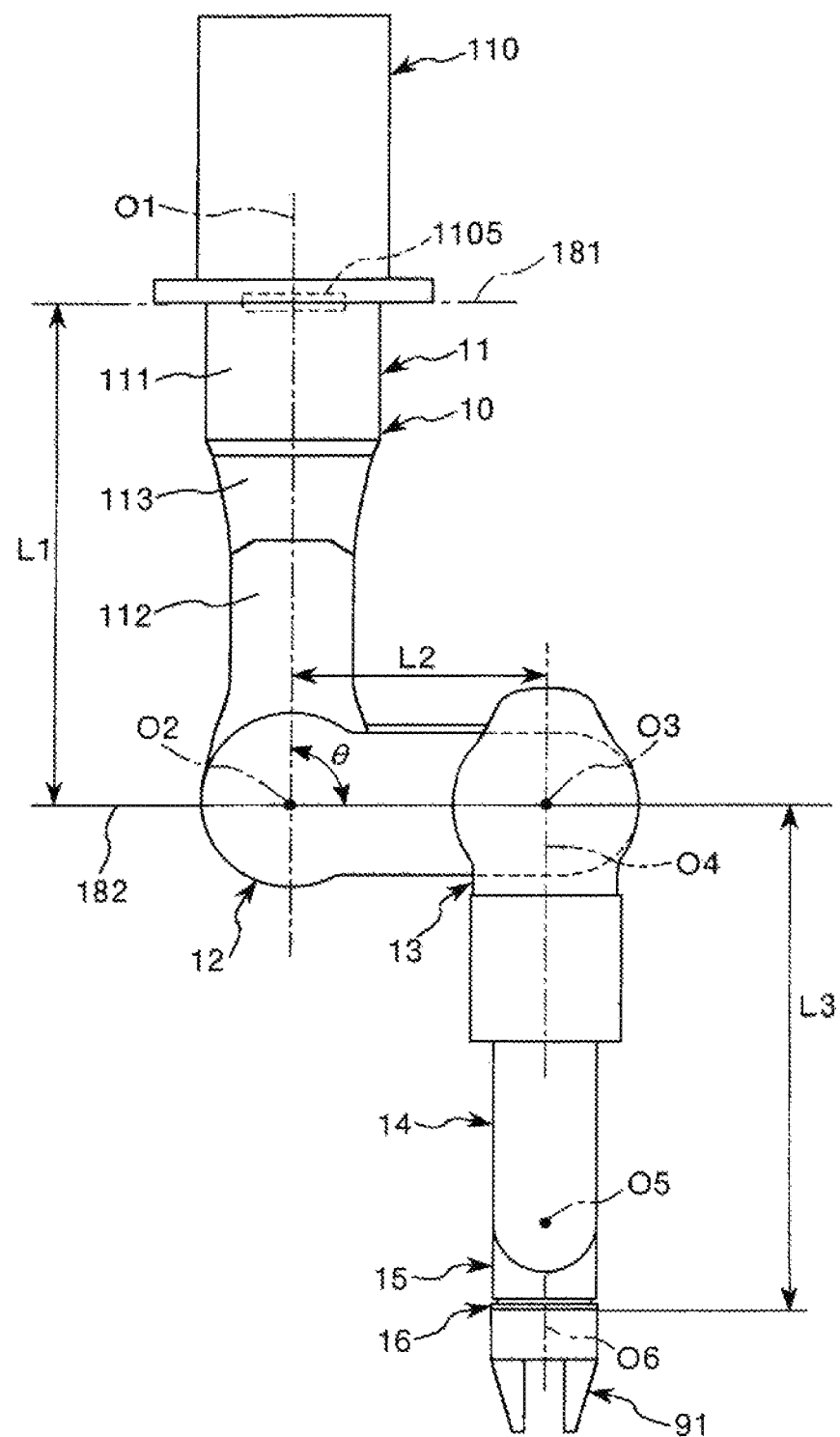
FIG. 4 is a schematic side view illustrating a state in which a first arm, a second arm, and a third arm of the robot illustrated in FIG. 1 do not overlap each other.
Figure 5:
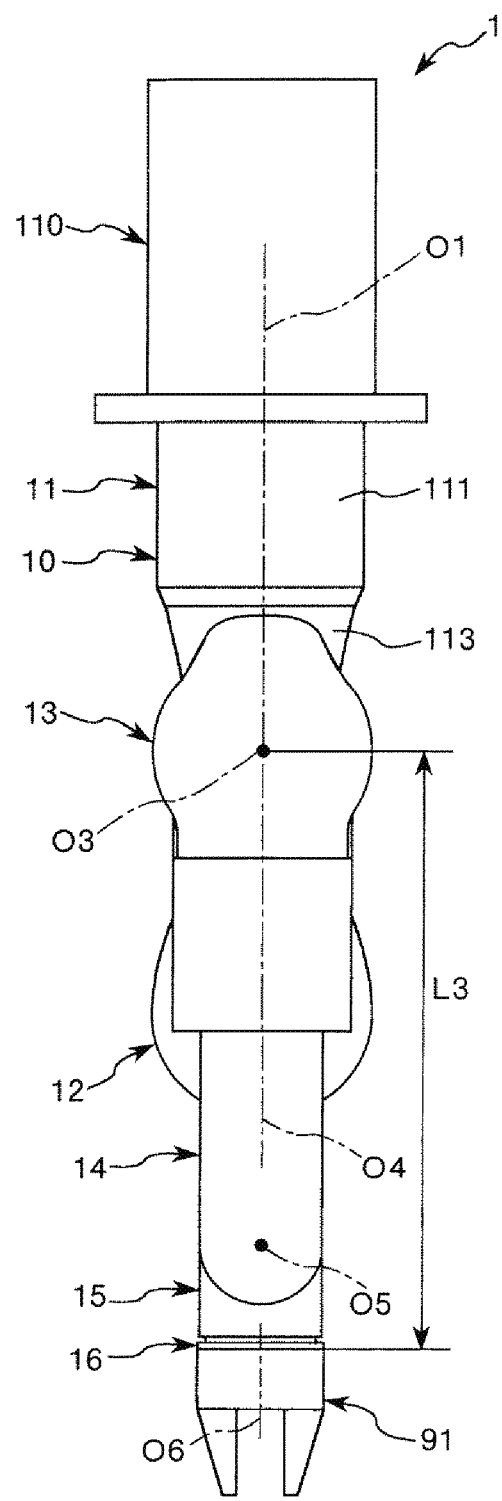
FIG. 5 is a schematic side view illustrating a state in which the first arm, the second arm, and the third arm of the robot illustrated in FIG. 1 overlap each other.
Figure 6:
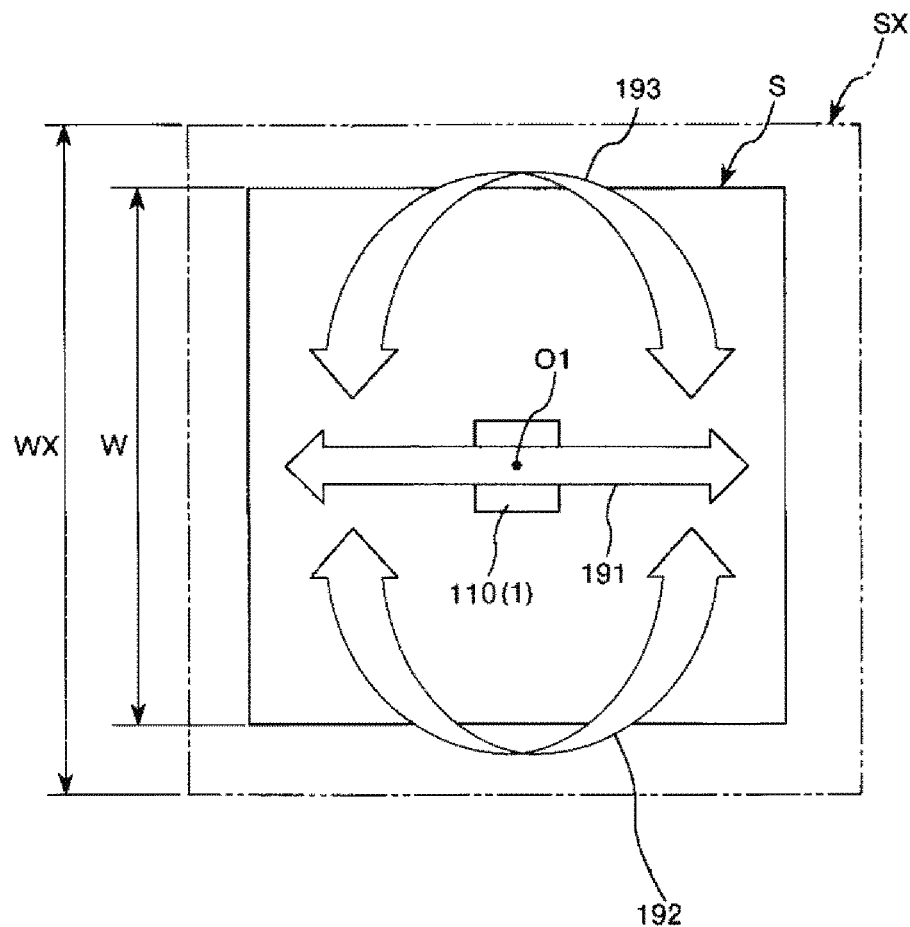
FIG. 6 is a diagram illustrating a moving route of a distal end portion of a robotic arm provided in the robot illustrated in FIG. 1.
Figure 7:
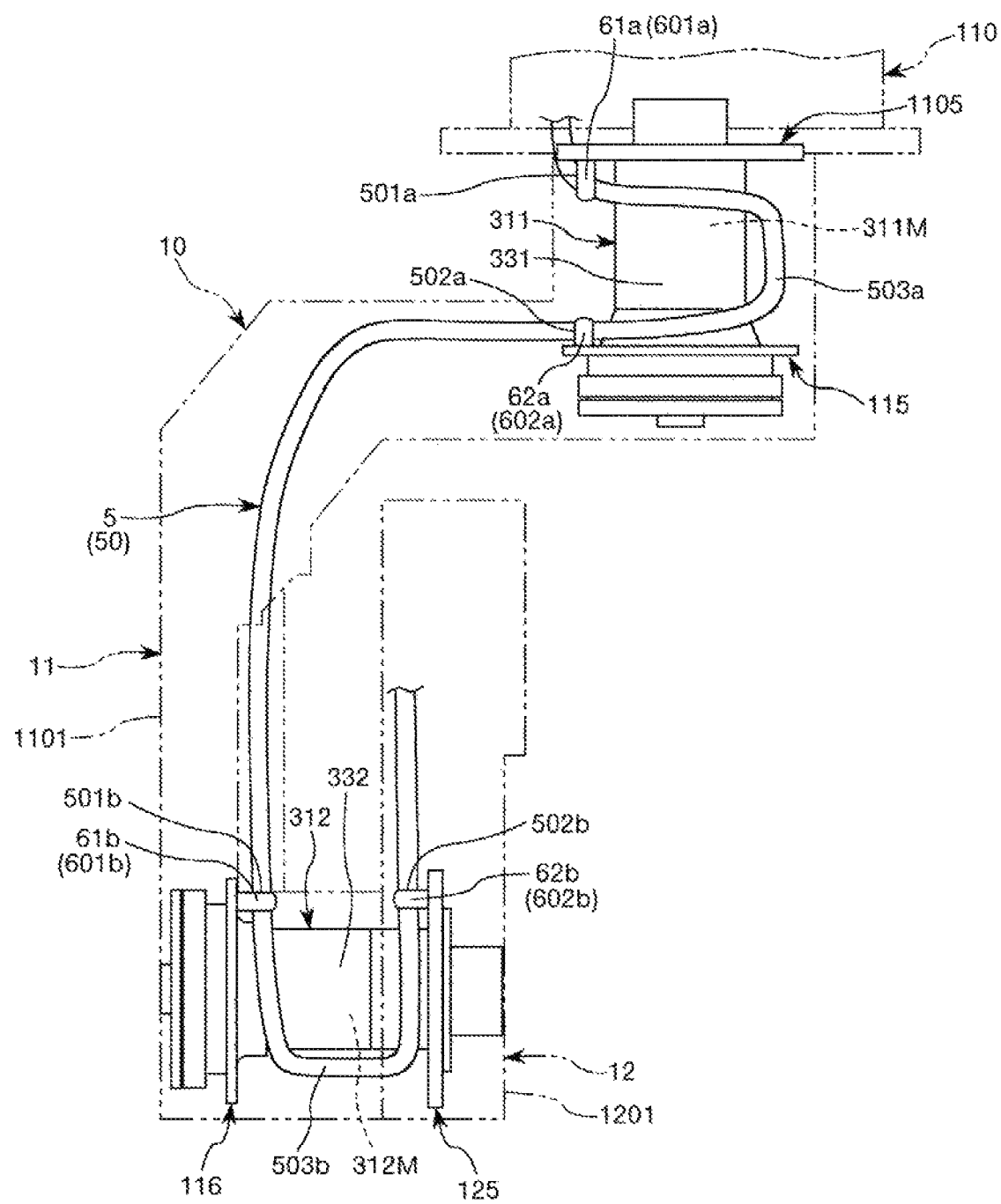
FIG. 7 is a view illustrating a bundle of flexible members provided in the robot illustrated in FIG. 1.

FIG. 1 is a perspective view illustrating the robot system according to a first embodiment of the invention. FIG. 2 is a block diagram of a configuration of a system of the robot and the control device illustrated in FIG. 1. FIG. 3 is a front view of the robot illustrated in FIG. 1. FIG. 4 is a schematic side view illustrating a state in which a first arm, a second arm, and a third arm of the robot illustrated in FIG. 1 do not overlap each other. FIG. 5 is a schematic side view illustrating a state in which the first arm, the second arm, and the third arm of the robot illustrated in FIG. 1 overlap each other. FIG. 6 is a diagram illustrating a moving route of a distal end portion of a robotic arm provided in the robot illustrated in FIG. 1. FIG. 7 is a view illustrating a bundle of flexible members provided in the robot illustrated in FIG. 1. Note that, hereinafter, the upper side (base 110 side) in FIG. 1 is referred to as a "proximal end side", and a side opposite thereto (a distal end side of a robotic arm 10) is referred to as a "distal end side". In addition, an up-down direction in FIG. 1 is referred to as a "vertical direction", and a rightward-leftward direction is referred to as a "horizontal direction".

A robot system 100 illustrated in FIG. 1 is an example of the robot system according to the invention. The robot system 100 includes a robot 1 as an example of the robot 1 according to the invention and a control device 8 (an example of the control device according to the invention) that controls operations of the robot 1.

The robot system 100 is used in work such as gripping, transporting, and assembly of a target object (not illustrated) such as an electronic component or an electronic device. In this case, the robot 1 performs the work such as gripping, transporting, and assembly of a target object under control by the control device 8.

Robot

The robot 1 illustrated in FIG. 1 includes the base 110 and the robotic arm 10 (manipulator). In addition, as illustrated in FIG. 2, the robot 1 includes a plurality of drive units 311 to 316 and a plurality of motor drivers 321 to 326 that generate power to drive the robotic arm 10 illustrated in FIG. 1. In addition, as illustrated in FIG. 3, a hand 91 (end effector) is detachably attached in a distal end portion of the robotic arm 10.

In addition, the robot 1 includes a bundle 5 in which flexible members 50 having wiring, a tube cluster, or the like, which is used in power supply, signal transmission, or the like to the drive units 311 to 316, the hand 91, or the like, are bound (refer to FIG. 7).

Base

The base 110 illustrated in FIG. 1 is a portion that is attached to a predetermined position in a work region in which the robot 1 performs work, and supports the robotic arm 10.

The robot 1 according to the embodiment is a so-called ceiling suspended type vertical articulated robot. In this case, as illustrated in FIG. 3, the base 110 is positioned on the uppermost side of the robot 1, and is attached (fixed) to an attachment surface 102 of a ceiling 101 in an installation space of the robot 1. In the embodiment, since the base 110 is positioned above a first arm 11 in the vertical direction, it is possible to improve, in particular, workability of the robot 1 in a region vertically below the robot 1.

In the embodiment, a plate-shaped flange 1110 provided under the base 110 is fixed to the attachment surface 102; however, a portion that is fixed to the attachment surface 102 is not limited thereto, and the top surface of the base 110 may be fixed to the attachment surface. In addition, there is no particular limitation on the fixing method, and, for example, it is possible to employ a fixing method or the like using a plurality of bolts. In addition, a fixing position of the base 110 is not limited to the ceiling of the installation space, and, for example, the base may be fixed to a wall, a floor, ground, or the like of the installation space, other than the ceiling.

Robotic Arm

The robotic arm 10 illustrated in FIG. 1 is rotatably supported by the base 110.

The robotic arm 10 is provided with the first arm 11 (arm), a second arm 12 (arm), a third arm 13 (arm), a fourth arm 14 (arm), a fifth arm 15 (arm), and a sixth arm 16 (arm). The first arm 11 (n-th arm: n is an integer of 1 or larger) is connected to an upper end portion of the base 110. The first arm 11, the second arm 12 ((n+1)-th arm), the third arm 13, the fourth arm 14, the fifth arm 15, and the sixth arm 16 are connected in this order from the proximal end side to the distal end side. The arms 11 to 16 are supported to be capable of shifting individually with respect to the base 110. Since the robot 1 is the vertical articulated robot that includes six (the plurality of) arms 11 to 16, it is possible to exhibit high workability with a wide drive range.

As illustrated in FIG. 3, the first arm 11 has a curved or bent shape and a proximal end portion thereof is connected to the base 110. The first arm 11 includes a first portion 111 that is connected to the base 110 and extends in the horizontal direction, a second portion 112 that is connected to the second arm 12 and extends in an up-down direction (vertical direction), and a third portion 113 that is positioned between the first portion 111 and the second portion 112 and extends in an inclined direction with respect to the horizontal direction and the up-down direction (vertical direction). Note that the first portion 111, the second portion 112, and the third portion 113 are integrally formed.

The second arm 12 has a longitudinal shape and is connected to a distal end portion of the first arm 11.

The third arm 13 has a longitudinal shape and is connected to an end portion of the second arm 12, which is opposite to the end portion to which the first arm 11 is connected.

The fourth arm 14 is connected to an end portion of the third arm 13, which is opposite to the end portion to which the second arm 12 is connected. The fourth arm 14 includes a pair of supports 141 and 142 which faces each other. The supports 141 and 142 are used in connection with the fifth arm 15. Note that the fourth arm 14 is not limited to such a structure, and, for example, the fourth arm may have one support (one-side support).

The fifth arm 15 is positioned between the supports 141 and 142 and is attached to the supports 141 and 142, thereby being connected to the fourth arm 14.

The sixth arm 16 has a plate shape as a circular shape in a plan view and is connected to a distal end portion of the fifth arm 15. In addition, the hand 91 is detachably attached to the distal end portion (distal end surface) of the sixth arm 16. Note that, in the embodiment, the hand 91 is described as an example of the end effector; however, the end effector is not limited to the hand 91. The end effector may be, for example, a member that is configured to include a suctioning mechanism that suctions a target object, a member that is configured to include a machining mechanism which performs machining or the like on a target object, or the like.

Each of exterior portions (members that configure outlines) of the arms 11 to 16 may be configured of one member, or may be configured of a plurality of members.

In addition, the base 110 and the first arm 11 are connected via a joint 171. The joint 171 has a mechanism that supports the first arm 11 such that the first arm is rotatable with respect to the base 110. In this manner, the first arm 11 is capable of rotating, with respect to the base 110, around a first rotation axis O1 in the vertical direction. The rotation around the first rotation axis O1 is performed through the drive by the drive unit 311 provided with a motor 311M.

The first arm 11 and the second arm 12 are connected via a joint 172. The joint 172 has a mechanism that supports the second arm 12 such that the second arm is rotatable with respect to the first arm 11. In this manner, the second arm 12 is capable of rotating, with respect to the first arm 11, around a second rotation axis O2 in the horizontal direction. The rotation around the second rotation axis O2 is performed through the drive by the drive unit 312 provided with a motor 312M.

The second arm 12 and the third arm 13 are connected via a joint 173. The joint 173 has a mechanism that supports the third arm 13 such that the third arm is rotatable with respect to the second arm 12. In this manner, the third arm 13 is capable of rotating, with respect to the second arm 12, around a third rotation axis O3 in the horizontal direction. The rotation around the third rotation axis O3 is performed through the drive by the drive unit 313 provided with a motor 313M.

The third arm 13 and the fourth arm 14 are connected via a joint 174. The joint 174 has a mechanism that supports the fourth arm 14 such that the fourth arm is rotatable with respect to the third arm 13. In this manner, the fourth arm 14 is capable of rotating, with respect to the third arm 13, around a fourth rotation axis O4 orthogonal to the third rotation axis O3. The rotation around the fourth rotation axis O4 is performed through the drive by the drive unit 314 provided with a motor 314M.

The fourth arm 14 and the fifth arm 15 are connected via a joint 175. The joint 175 has a mechanism that supports the fifth arm 15 such that the fifth arm is rotatable with respect to the fourth arm 14. In this manner, the fifth arm 15 is capable of rotating, with respect to the fourth arm 14, around a fifth rotation axis O5 orthogonal to the fourth rotation axis O4. The rotation around the fifth rotation axis O5 is performed through the drive by the drive unit 315 provided with a motor 315M.

The fifth arm 15 and the sixth arm 16 are connected via a joint 176. The joint 176 has a mechanism that supports the sixth arm 16 such that the sixth arm is rotatable with respect to the fifth arm 15. In this manner, the sixth arm 16 is capable of rotating, with respect to the fifth arm 15, around a sixth rotation axis O6 orthogonal to the fifth rotation axis O5. The rotation around the sixth rotation axis O6 is performed through the drive by the drive unit 316 provided with a motor 316M.

As described above, the robot 1 includes the multiple (in the embodiment, six) drive units 311 to 316 corresponding to the arms 11 to 16. In addition, the drive units 311 to 316 include the corresponding motors 311M to 316M (actuators) described above and deceleration devices (not illustrated) that reduce driving forces of the motors 311M to 316M, respectively. In addition, the motors 311M to 316M are electrically connected to the corresponding motor drivers 321 to 326, respectively, and are controlled by the control device 8 via the corresponding motor drivers 321 to 326. In the embodiment, as illustrated in FIG. 3, the motor drivers 321 to 326 are installed in the base 110.

In addition, each of the drive units 311 to 316 is provided with an angle sensor such as an encoder, a rotary encoder, or the like, although not illustrated. In this manner, it is possible to detect a rotation angle of a rotating shaft of the motors or the deceleration devices provided in the drive units 311 to 316.

Hereinafter, a configuration of the robotic arm 10 described above will be described.

As illustrated in FIG. 4, a length L1 of the first arm 11 is set to be longer than a length L2 of the second arm 12. Here, the length L1 of the first arm 11 is a distance between the second rotation axis O2 and a center line 181, when viewed from the second rotation axis O2. The center line 181 is a line extending in the horizontal direction in FIG. 4 of a flange 1105 (bearing) as a rotating member that supports the first arm 11 such that the first arm is capable of rotating. In addition, a length L2 of the second arm 12 is a distance between the second rotation axis O2 and the third rotation axis O3, when viewed in the axial direction of the second rotation axis O2.

In addition, when viewed in the axial direction of the second rotation axis O2, the robot 1 has a configuration in which it is possible to have an angle θ of 0° between the first arm 11 and the second arm 12. In other words, as illustrated in FIG. 5, when viewed in the axial direction of the second rotation axis O2, the robot 1 has a configuration in which it is possible to overlap the first arm 11 and the second arm 12. Regarding the second arm 12, when viewed in the axial direction of the second rotation axis O2, when the first arm 11 and the second arm 12 overlap each other, the second arm 12 is configured to avoid interference with the first arm 11. Here, the angle θ between the first arm 11 and the second arm 12 is an angle between the first rotation axis O1 and a straight line 182 (central axis of the second arm 12 when viewed in the axial direction of the second rotation axis O2) that passes through the second rotation axis O2 and the third rotation axis O3, when viewed in the axial direction of the second rotation axis O2.

In addition, when viewed in the axial direction of the second rotation axis O2, the robot 1 has a configuration in which it is possible to overlap the second arm 12 and the third arm 13. Hence, when viewed in the axial direction of the second rotation axis O2, the robot 1 has a configuration in which it is possible to simultaneously overlap the first arm 11, the second arm 12, and the third arm 13.

In addition, a total length L3 of the third arm 13, the fourth arm 14, the fifth arm 15, and the sixth arm 16 is set to be longer than the length L2 of the second arm 12. In this manner, when viewed in the axial direction of the second rotation axis O2, it is possible to cause the distal end (distal end of the sixth arm 16) of the robotic arm 10 to project from the second arm 12 in a state in which the second arm 12 and the third arm 13 overlap each other. In this manner, the hand 91 can be prevented from interfering with the first arm 11 and the second arm 12. Here, the total length L3 of the third arm 13, the fourth arm 14, the fifth arm 15, and the sixth arm 16 is a distance between the third rotation axis O3 and the distal end of the sixth arm 16, when viewed in the axial direction of the second rotation axis O2. In this case, as illustrated in FIG. 5, the third arm 13, the fourth arm 14, and the fifth arm 15 are in a state in which the fourth rotation axis O4 and the sixth rotation axis O6 are coincident with or parallel to each other.

The robot 1 including the robotic arm 10 satisfies such a relationship, and thereby it is possible to cause the hand 91 (distal end of the third arm 13) to move to a position different by 180° around the first rotation axis O1, without causing the first arm 11 to rotate, but through a state (state in which the first arm 11 and the second arm 12 overlap each other) in which the second arm 12 and the third arm 13 are caused to rotate and the angle θ between the first arm 11 and the second arm 12 is 0°, when viewed in the axial direction of the second rotation axis O2.

Here, as described above, when viewed in the axial direction of the second rotation axis O2 as an (n+1)-th rotation axis, the first arm 11 as an n-th arm is longer than the second arm 12 as an (n+1)-th arm in length, and it is possible to overlap the first arm 11 and the second arm 12. Therefore, when the first arm 11 and the second arm 12 overlap each other in the view in the axial direction of the second rotation axis O2, it is possible to overlap the first arm 11 and the second arm 12 without interference with each other.

The robotic arm 10 having such a configuration enables the robot 1 to perform an operation of causing the hand 91 in FIG. 6 to move as illustrated in an arrow 191, without performing an operation of causing the hand 91 to move as illustrated in arrows 192 and 193 in FIG. 6, when viewed in the direction of the first rotation axis O1. In other words, in the robot 1, it is possible to perform an operation of causing the hand 91 (distal end of the robotic arm 10) to move straightly along a line, when viewed in the axial direction of the first rotation axis O1. In this manner, it is possible to reduce a space in which the robot 1 is prevented from interference. Therefore, it is possible to reduce an area S (installation area) of an installation space for installing the robot 1 so as to be smaller than an area SX of the installation space in the related art. Specifically, as illustrated in FIG. 6, it is possible for a width W of the installation space of the robot 1 to be smaller than a width WX of the installation space in the related art, and, for example, to be 80% or less of the width WX. Therefore, since it is possible to reduce a work region of the robot 1 in a width direction, it is possible to dispose more robots 1 along the production line per unit length, and it is possible to shorten the production line. In addition, it is possible to reduce the height (length in the vertical direction) of the installation space of the robot 1 such that the height is reduced to be lower than that in the related art, and specifically it is possible to reduce the height to 80% or less of the height in the related art.

In addition, since it is possible to perform the operation of causing the hand 91 to move as indicated by the arrow 191, it is possible, for example, to make the first arm 11 not to rotate or to reduce a rotation angle (rotation amount) of the first arm 11 when the hand 91 is caused to move to a position different by 180° around the first rotation axis O1. Therefore, it is possible to reduce rotation of the first arm 11 having the second portion 112 and the third portion 113 as portions which overhang on the outer side from the base 110, when viewed in the axial direction of the first rotation axis O1. Therefore, it is possible to reduce an occurrence of interference of the robot 1 with peripheral equipment.

In addition, since it is possible to perform the operation of causing the hand 91 to move as illustrated with the arrow 191, it is possible to reduce the movement of the robot 1, and it is possible to efficiently drive the robot 1. Therefore, it is possible to shorten takt time and it is possible to improve work efficiency. In addition, since it is possible to cause the distal end of the robotic arm 10 to move straightly following a line, it is easy to know the movement of the robot 1.

In addition, when the operation of causing the hand 91 of the robot 1 to move to a position different by 180° around the first rotation axis O1 is performed by simply causing the first arm 11 to rotate around the first rotation axis O1 as in the robot in the related art, there is a possibility that the robot 1 will interfere with peripheral devices. Therefore, it is necessary to instruct the robot 1 in a retraction point such that the interference is avoided. For example, when only the first arm 11 is caused to rotate by 90° around the first rotation axis O1, and the robot 1 interferes with the peripheral devices, it is necessary to instruct the robot 1 in multiple retraction points such that the robot does not interfere with the peripheral devices. In the robot in the related art, it is necessary to instruct the robot in multiple retraction points, a large number of retraction points need to be prepared, and time and effort are required for the instruction.

By comparison, in the robot 1, in a case where the operation of causing the hand 91 to move to a position different by 180° around the first rotation axis O1, there are very small regions or portions in which there is a possibility of occurrence of interference. Therefore, it is possible to reduce the number of retraction points and it is possible to reduce time and effort taken for the instruction. In the robot 1, the number of retraction points which are instructed may be about one third of the robot in the related art, and thus instruction thereof is remarkably easily performed.

In addition, in the robot 1, a region (portion) 105 of the third arm 13 and the fourth arm 14, which is surrounded in a two-dot chain line on the right side in FIG. 3, is a region (portion) in which the robot 1 does not interfere with the robot 1 itself and another member or interference is unlikely to occur. Therefore, in a case where a predetermined member is mounted in the region 105, the member is unlikely to interfere with the robot 1, the peripheral devices, or the like. Therefore, in the robot 1, it is possible to mount a predetermined member in the region 105. In particular, in a case where, of the region 105, the predetermined member is mounted in a region of the third arm 13 on the right side in FIG. 3, a probability that the member interferes with peripheral devices (not illustrated) is further reduced, and thus the operation is more effectively performed.

Examples that can be mounted in the region 105 include a control device that controls drive of a sensor such as a hand eye camera, and a solenoid valve of a suctioning mechanism. The solenoid valve of the suctioning mechanism is used, for example, in a case of using an end effector that includes a suctioning mechanism, instead of the hand 91. When the solenoid valve or the like is installed in the region 105, the solenoid valve is not interrupted when the robot 1 is driven. As described above, the region 105 is highly convenient.

In addition, in the robot 1, a region (portion) 106 between the ceiling 101 and the first arm 11, which is surrounded in a two-dot chain line on the left side in FIG. 3, is a region (portion) in which, similar to the region 105 described above, the robot 1 does not interfere with the robot 1 itself and another member or interference is unlikely to occur. Therefore, similar to the region 105, it is possible to mount a predetermined member in the region 106.

Control Device

The control device 8 illustrated in FIG. 2 is configured of a personal computer (PC) that includes, for example, a central processing unit (CPU), a random access memory (RAM), a read only memory (ROM), or the like. In addition, the control device 8 includes a drive control unit 81, a processing unit 82, and a storage unit 83. For example, the drive control unit 81 has a function of control drive (for example, angular velocity, rotation angle, or the like) of the plurality of drive units 311 to 316, individually, based on detection results (signals) input from various types of sensors or the like. The processing unit 82 has a function of performing various types of calculation or the like, based on various signals (including the detection results). The storage unit 83 has a function of recording a program for controlling the drive (actuation of the robot 1) of the drive units 311 to 316, various types of signals, or the like.

The control device 8, which controls the actuation of the robot 1, is capable of sequentially controlling the work of the members of the robot 1 in accordance with a predetermined program. Therefore, it is possible to control operations of the robot 1 with high accuracy.

In the embodiment, the control device 8 is provided separately from the robot 1; however, a part or the entirety of the control device may be installed in the robot 1. In addition, the robot 1 and the control device 8 may be connected with or without wires.

Bundle of Flexible Members

As illustrated in FIG. 7, the bundle 5 of the plurality of flexible members 50 is provided from the base 110 through the inside of the robotic arm 10 so as to pass along the robotic arm 10.

As described above, the flexible members 50 have the wiring, the tube cluster, or the like which is used in power supply, signal transmission, or the like to the drive units 311 to 316, the hand 91, or the like. An example of the tube cluster includes a tube (pipe member) or the like through which gas such as air, water, or a fluid such as a liquid such as hydraulic oil circulates. Examples of the wiring include electrical wiring, an optical fiber, or the like. Examples of the flexible member having the wiring include a cable or the like in which the wiring is covered with a protective tube (sheath) or the like. In addition, the plurality of flexible members 50 are bound with a binding member such as a binding band, thereby configuring the bundle 5.

As illustrated in FIG. 7, the first arm 11 has a cover member 1101 (member that configures the outline of the first arm 11) which is provided with an internal space, the second arm 12 has a cover member 1201 (member that configures the outline of the second arm 12) which is provided with an internal space, and the bundle 5 is disposed in the cover members 1101 and 1201. The bundle 5, which passes from the base 110 through the inside of the cover members 1101 and 1201 (inside of the arms 11 and 12), is provided, for example, to pass through the inside of cover members provided over the arms 13 and 14 and along the outside of the fifth arm 15 and the sixth arm 16, although not illustrated. In addition, the plurality of flexible members 50 of the bundle 5 are distributed to corresponding devices (the drive units 311 to 316 or the hand 91), respectively.

In addition, the bundle 5 has portions folded around a cylindrical frame 331 of the drive unit 311 and a cylindrical frame 332 of the drive unit 312, respectively. The motor 311M (actuator) is provided in the frame 331, and the motor 312M (actuator) is provided in the frame 332. In addition, a deceleration device (not illustrated) and an encoder (not illustrated) are provided in each of the frames 331 and 332.

Specifically, the bundle 5 has a first fixed portion 501a fixed to the flange 1105 (rotation member) which is connected to the frame 331, a second fixed portion 502a fixed to a flange 115 (rotation member) which is connected to the frame 331, and a folded portion 503a positioned between the first fixed portion 501a and the second fixed portion 502a.

The flange 1105 is a member that is included in the base 110. The plurality of flexible members 50 are bound with a binding member 601a, and the bundle 5 is fixed to the flange 1105 by a fixture 61a (clamp) in the vicinity of the binding member 601a. A portion of the bundle 5, which is fixed by the fixture 61a is the first fixed portion 501a. The flange 115 is a member that is included in the first arm 11. The plurality of flexible members 50 are bound with a binding member 602a, and the bundle 5 is fixed to the flange 115 by a fixture 62a (clamp) in the vicinity of the binding member 602a. A portion of the bundle 5, which is fixed by the fixture 62a is the second fixed portion 502a. Note that the fixtures 61a and 62a include sheet metal, a binding band, or the like.

In addition, the folded portion 503a is wound in a folded state along an outer circumference of the frame 331. In other words, the folded portion 503a is disposed along the outer circumference of the frame 331 so as to be folded in a circumferential direction of a shaft portion (output shaft) of the motor 311M, and the folded portion has a U shape in a side view. According to the bundle 5 having the folded portion 503a, it is possible to reduce an occurrence of twisting or breaking of the flexible members 50 that configure the bundle 5. Therefore, it is possible to reduce damage to the inside of each of the flexible members 50, and it is possible to improve durability of each of the flexible members 50.

In addition, the bundle 5 has a first fixed portion 501b fixed to a flange 116 (rotation member) which is connected to the frame 332, a second fixed portion 502b fixed to a flange 125 (rotation member) which is connected to the frame 332, and a folded portion 503b positioned between the first fixed portion 501b and the second fixed portion 502b.

The flange 116 is a member that is included in the first arm 11. The plurality of flexible members 50 are bound with a binding member 601b, and the bundle 5 is fixed to the flange 116 by a fixture 61b (clamp) in the vicinity of the binding member 601b. The flange 125 is a member that is included in the second arm 12. The plurality of flexible members 50 are bound with a binding member 602b, and the bundle 5 is fixed to the flange 125 by a fixture 62b (clamp) in the vicinity of the binding member 602b. In addition, similar to the folded portion 503a, the folded portion 503b is wound in a folded state along an outer circumference of the frame 332.

Although not illustrated, similar to the drive unit 312, the drive units 313 and 314 have cylindrical frames, respectively, and a part of the bundle 5 is provided so as to wind along the outer circumference of the corresponding frame.

The plurality of flexible members 50 that configure the bundle 5 are disposed around the frames 331 and 332 and the frames of the drive units 313 and 314 substantially in the same manner. Therefore, hereinafter, layout of the plurality of flexible members 50 at the frame 332 is representatively described.

Figure 8:
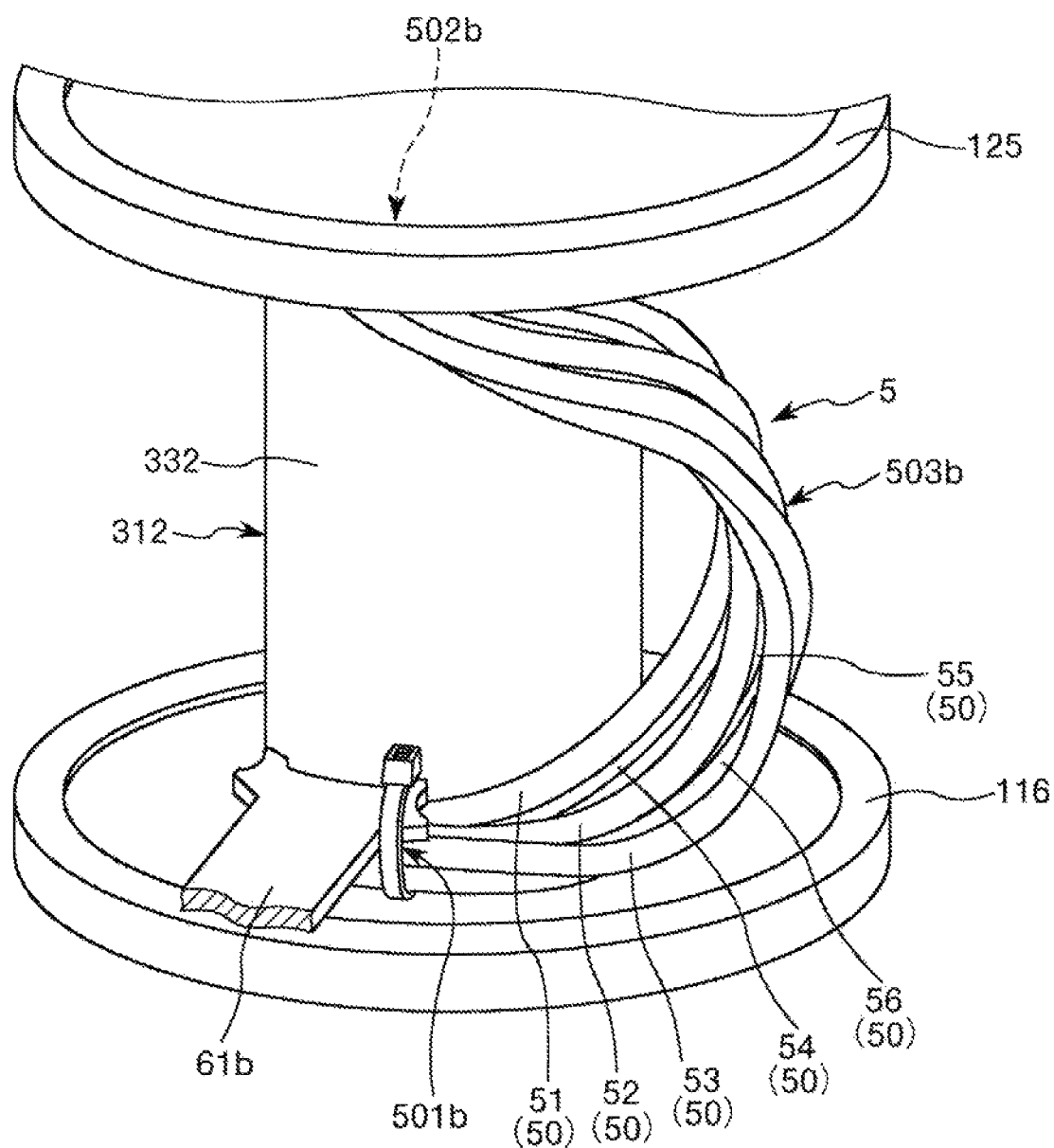
FIG. 8 is a view illustrating a plurality of flexible members that configure the bundle of flexible members illustrated in FIG. 7.
Figure 9:
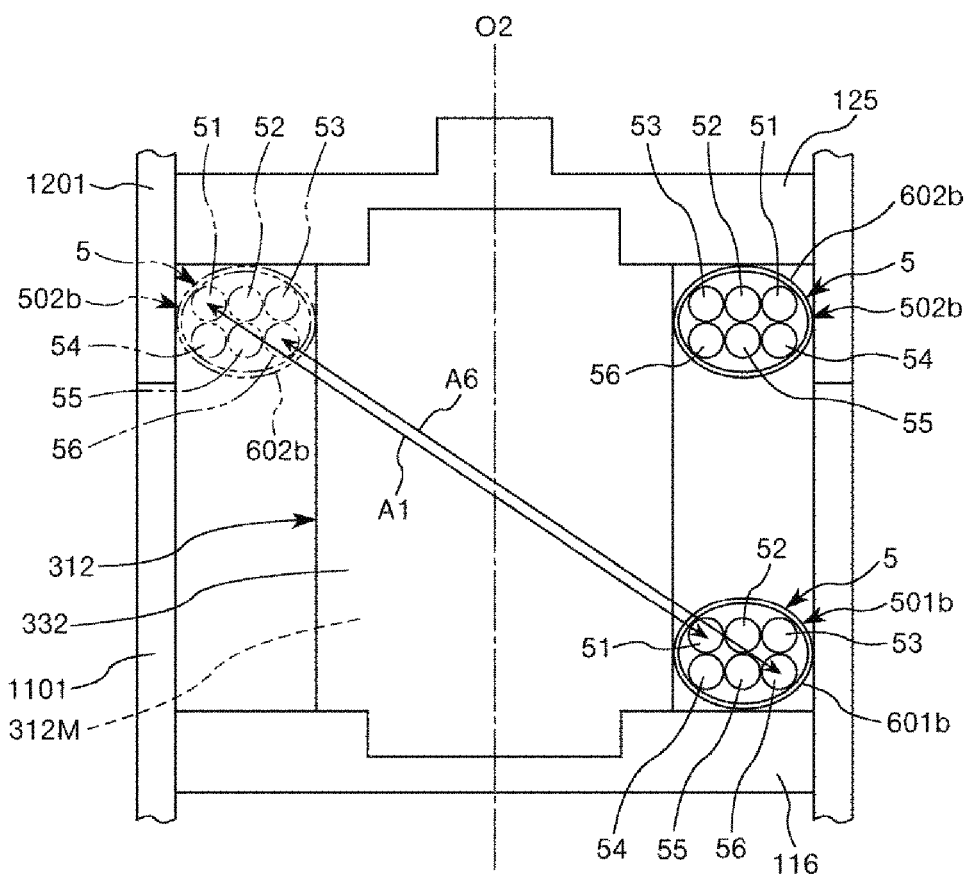
FIG. 9 is a view for illustrating layout of the plurality of flexible members illustrated in FIG. 8.
Figure 10:
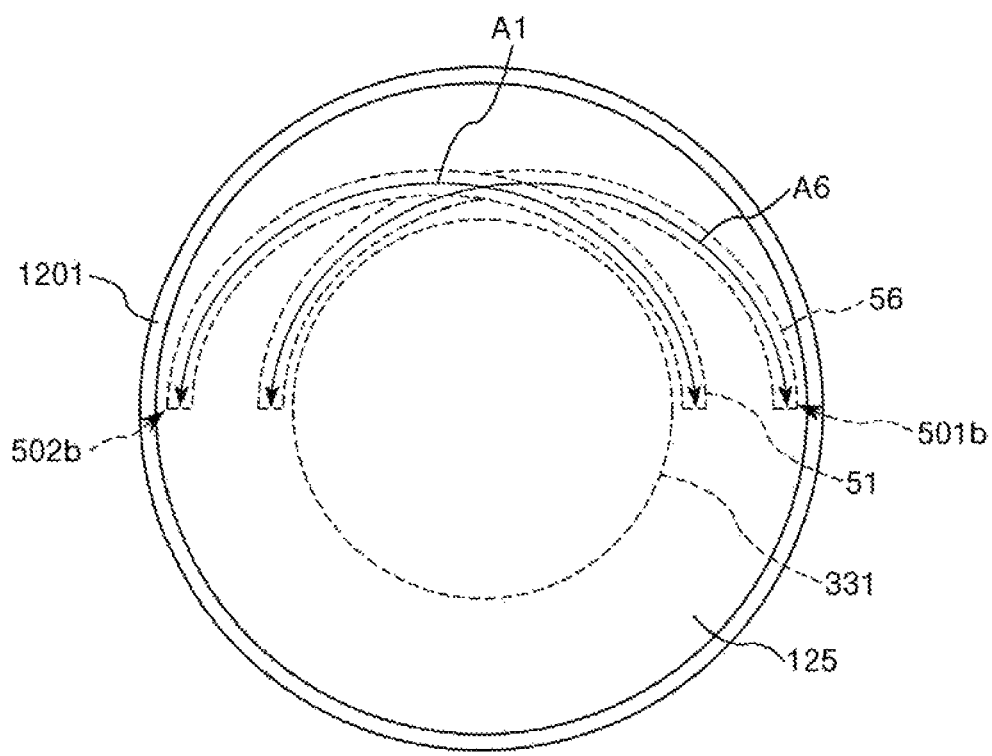
FIG. 10 is a view for illustrating layout of two flexible members of the plurality of flexible members illustrated in FIG. 9.
Figure 11:
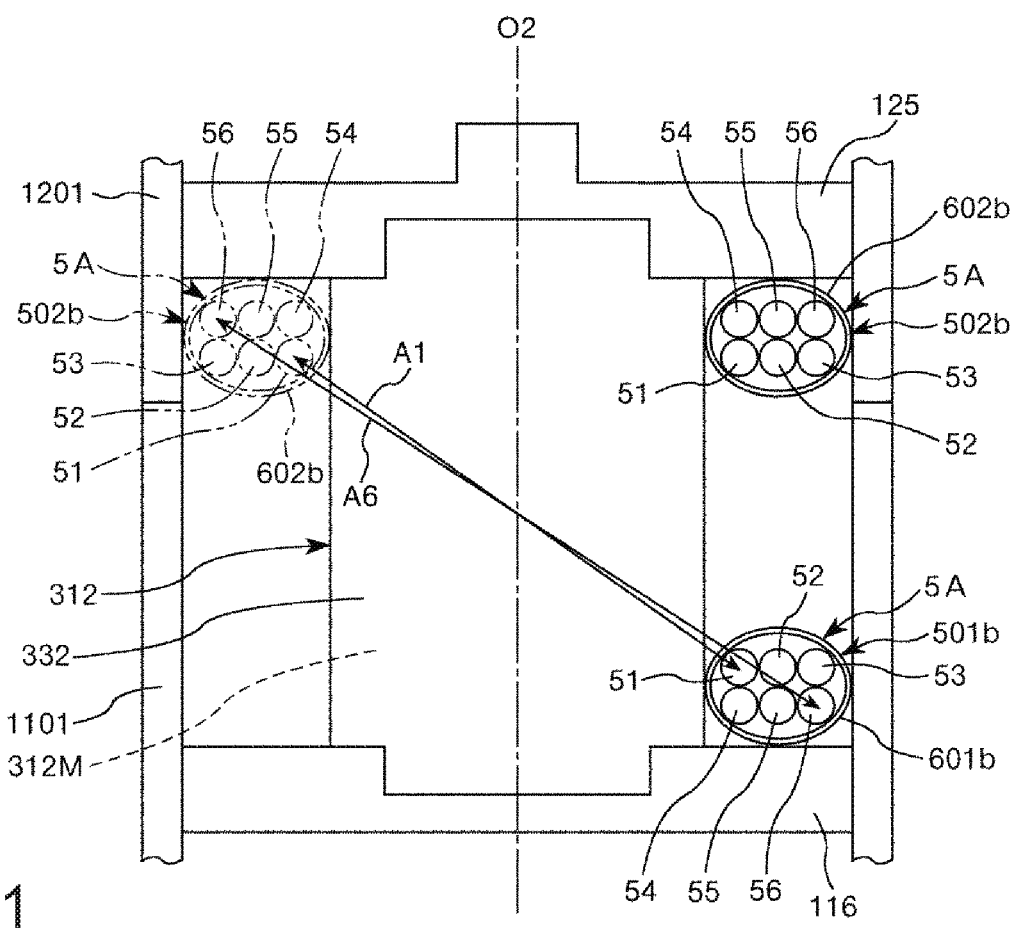
FIG. 11 is a reference view for illustrating layout of the plurality of flexible members illustrated in FIG. 9.
Figure 12:
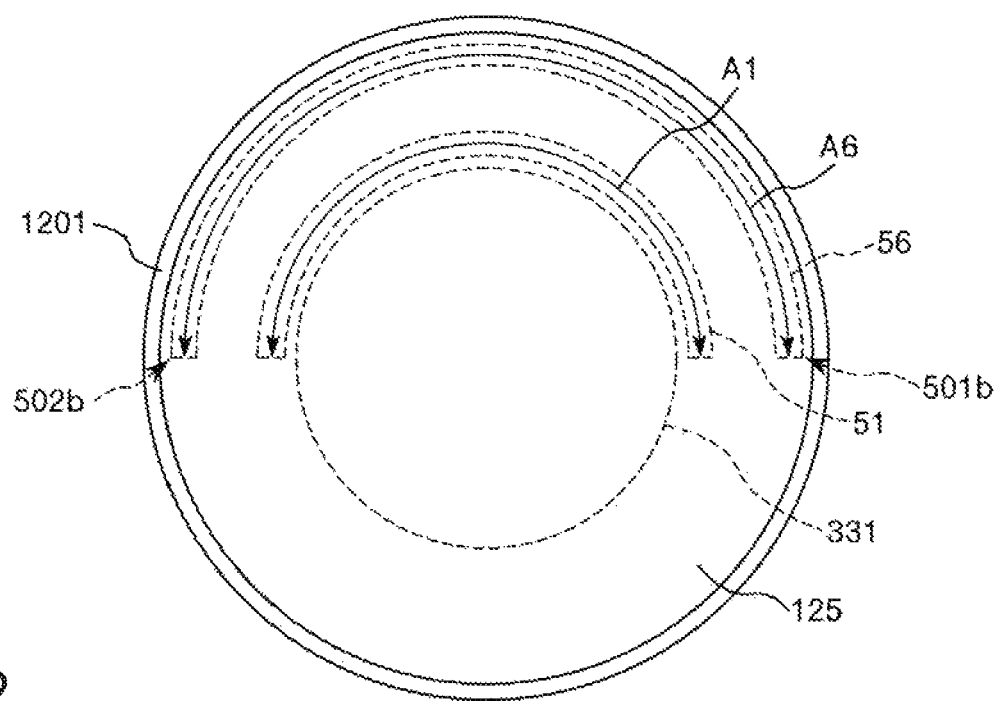
FIG. 12 is a reference view for illustrating layout of two flexible members of the plurality of flexible members illustrated in FIG. 11.

FIG. 8 is a view illustrating the plurality of flexible members that configure the bundle of flexible members illustrated in FIG. 7. FIG. 9 is a view for illustrating layout of the plurality of flexible members illustrated in FIG. 8. FIG. 10 is a view for illustrating layout of two flexible members of the plurality of flexible members illustrated in FIG. 9. FIG. 11 is a reference view for illustrating layout of the plurality of flexible members illustrated in FIG. 9. FIG. 12 is a reference view for illustrating layout of two flexible members of the plurality of flexible members illustrated in FIG. 11.

The upper side in FIG. 8 is the second arm 12 side, and the lower side in FIG. 8 is the first arm 11 side. In addition, FIG. 9 is a sectional view schematically illustrating the frame 332 and the vicinity thereof. FIG. 10 is a top view schematically illustrating the frame 332 and the vicinity thereof, when viewed from the flange 125 side. In addition, FIG. 11 corresponds to FIG. 9, and FIG. 12 corresponds to FIG. 10.

As illustrated in FIG. 8, in the embodiment, the bundle 5 has six flexible members 51 to 56 as the plurality of flexible members 50 around the frame 332. The bundle 5 having the six flexible members 51 to 56 is twisted between the first fixed portion 501*b* and the second fixed portion 502*b*. In the embodiment, the bundle 5 is twisted by 180°. In this manner, the flexible members 51 to 56 are disposed in the first fixed portion 501*b* and the second fixed portion 502*b* as illustrated in FIG. 9.

Specifically, as illustrated in a solid line in FIG. 9, the flexible members 51 and 54, the flexible members 52 and 55, and the flexible members 53 and 56 are disposed in the first fixed portion 501*b* in this order from the frame 332 side. In addition, in the first fixed portion 501*b*, the flexible members 54, 55, and 56 are disposed on the flange 116 side, and the flexible members 51, 52, and 53 are disposed on the opposite side thereto.

On the other hand, as illustrated in a solid line in FIG. 9, the flexible members 53 and 56, the flexible members 52 and 55, and the flexible members 51 and 54 are disposed in the second fixed portion 502*b* in this order from the frame 332 side. In addition, in the second fixed portion 502*b*, the flexible members 51, 52, and 53 are disposed on the flange 125 side, and the flexible members 54, 55, and 56 are disposed on the opposite side thereto.

The flexible members 51 and 54 positioned on the innermost side (frame 332 side) in the first fixed portion 501*b* are positioned on the outermost side (opposite side to the frame 332) in the second fixed portion 502*b*. In addition, the flexible members 53 and 56 positioned on the outermost side in the first fixed portion 501*b* are positioned on the innermost side in the second fixed portion 502*b*. This state, that is, the state illustrated in the solid line in FIG. 9 is set to a "first state".

When, in the first state, the drive of the motor 312M causes the flange 125 (second arm 12) to rotate by 180° around the axis O2 with respect to the flange 116 (first arm 11), the flexible members 51 to 56 enter a state illustrated in a two-dot chain line in FIG. 9 in the second fixed portion 502*b*. This state is set to a "second state". Similar to the first state, in the second state, the flexible members 53 and 56, the flexible members 52 and 55, and the flexible members 51 and 54 are disposed in the second fixed portion 502*b* in this order from the frame 332 side. Hence, also in the case of the second state, with reference to the first fixed portion 501*b* illustrated in the solid line in FIG. 9 and the second fixed portion 502*b* illustrated in the two-dot chain line in FIG. 9, the flexible members 51 and 54, which are positioned on the innermost side in the first fixed portion 501*b*, are positioned on the outermost side in the second fixed portion 502*b*. In addition, the flexible members 53 and 56 positioned on the outermost side in the first fixed portion 501*b* are positioned on the innermost side in the second fixed portion 502*b*.

Such layout of the flexible members 51 to 56 enables all of the flexible members 51 to 56 to have substantially the same length, in the second state. In other words, according to the robot 1 of the embodiment, it is possible for the flexible members 51 to 56 to have the same length which is needed when the second arm 12 rotates by 180° with respect to the first arm 11. For example, as illustrated in FIGS. 9 and 10, it is possible for a length A1 of the flexible member 51 from the first fixed portion 501*b* to the second fixed portion 502*b* in the second state to be substantially equal to a length A6 of the flexible member 56.

By comparison, as illustrated in a solid line in FIG. 11, in an untwisted bundle 5A, the flexible members 51 and 54, the flexible members 52 and 55, and the flexible members 53 and 56 are disposed in this order from the frame 332 side in both of the first fixed portion 501*b* and the second fixed portion 502*b*.

In the state illustrated in the solid line in FIG. 11, when the drive of the motor 312M causes the flange 125 to rotate by 180° around the axis O2 with respect to the flange 116, the flexible members 51 to 56 enter a state illustrated in a two-dot chain line in FIG. 11 in the second fixed portion 502*b*. In this state, the flexible members 51 and 54, the flexible members 52 and 55, and the flexible members 53 and 56 are disposed in the second fixed portion 502*b* in this order from the frame 332 side. In other words, with reference to the first fixed portion 501*b* illustrated in the solid line in FIG. 11 and the second fixed portion 502*b* illustrated in the two-dot chain line in FIG. 11, the flexible members 51 and 54, which are positioned on the innermost side in the first fixed portion 501*b*, are positioned on the innermost side in the second fixed portion 502*b*. In addition, the flexible members 53 and 56 positioned on the outermost side in the first fixed portion 501*b* are positioned on the outermost side in the second fixed portion 502*b*.

As described above, in the untwisted bundle 5A, there are differences in lengths of the flexible members 51 to 56 required to wind around the outer circumference of the frame 332. For example, as illustrated in FIG. 12, the length A1 of the flexible member 51 from the first fixed portion 501*b* to the second fixed portion 502*b* is too shorter than the length A6 of the flexible member 56. Hence, in a case where the flexible members 51 to 56 are disposed as illustrated in FIG. 11, it is necessary to consider the lengths of the flexible members 51 to 56, individually, such that it is possible to reduce a possibility of breaking of the flexible members 51 to 56 around the frame 332 due to bending or tension thereof. Therefore, there is a need to prepare the bundle 5A formed of the plurality of bound flexible members 51 to 56 in advance.

By comparison, as described above, in the embodiment, since the flexible members 51 to 56 are disposed as illustrated in FIG. 9, it is possible to reduce the possibility of breaking of the flexible members 51 to 56 due to the bending or tension thereof even when the bundle 5 formed of the bound flexible members 51 to 56 which as substantially equal lengths is prepared.

As described above, the robot 1 as an example of the robot according to the invention includes the first arm 11 as the n-th arm, the second arm 12 as the (n+1)-th arm that is rotatably provided on the first arm 11, the drive unit 312 (frame 332 included in the drive unit 312 connected to the flange 116 included in the first arm 11 and the flange 125 included in the second arm 12) as a member provided between the first arm 11 and the second arm 12, and the flexible members 51 to 56 having at least one of the wiring and the tube cluster.

In addition, each of the flexible members 51 to 56 has the portion fixed to the flange 116, the portion fixed to the flange 125, and the portion that is positioned between the flange 116 and the flange 125 and is wound around the outer circumference of the frame 332 in the folded state. As described above, the portion of the flexible member 51 that is fixed to the flange 116 is positioned on the frame 332 side from the portion of the flexible member 56 that is fixed to the flange 116. In addition, the portion of the flexible member 56 that is fixed to the flange 125 is positioned on the frame 332 side from the portion of the flexible member 51 that is fixed to the flange 125.

According to the robot 1, as illustrated in FIG. 10, it is possible for the length A1 of the flexible member 51 from the first fixed portion 501b to the second fixed portion 502b in the second state to be substantially equal to the length A6 of the flexible member 56. In other words, according to the robot 1 of the embodiment, it is possible for the length A1 of the flexible member 51 and the length A6 of the flexible member 56 to be an equal length which is needed when the second arm 12 rotates by 180° with respect to the first arm 11. Therefore, it is possible to reduce a possibility of breaking of the flexible members 51 and 56 due to the bending and tension thereof. In addition, even in a case where a space between the frame 332 and the cover members 1101 and 1201 provided on the outer circumference side of the frame 332 member is relatively narrow, it is possible for the flexible member 51 and the flexible member 56 to smoothly move without interference with each other. Therefore, even in a case of a relatively narrow space in which the flexible members 51 and 56 are disposed, it is possible to reduce a possibility of breaking of the flexible members 51 and 56 due to the bending or tension thereof. In the embodiment, the flexible member 51 corresponds to a "first flexible member", and the flexible member 56 corresponds to a "second flexible member"; however, as long as the layout relationship described above is satisfied, any one of the flexible members 51 to 56 is set to the "first flexible member" or the "second flexible member".

Further, as described above, the robot 1 includes the bundle 5 of the plurality of flexible members 50 (flexible members 51 to 56) including the flexible member 51 and the flexible member 56, and the bundle 5 has the first fixed portion 501b fixed to the flange 116 included in the first arm 11, the second fixed portion 502b fixed to the flange 125 included in the second arm 12, and the folded portion 503b that is positioned between the flange 116 and the flange 125 and is wound around the outer circumference of the frame 332 in the folded state. The bundle 5 is twisted between the first fixed portion 501b and the second fixed portion 502b. Therefore, it is possible for the lengths of all of the flexible members 51 to 56, which configure the bundle 5, from the first fixed portion 501b to the second fixed portion 502b in the second state to be substantially equal. Therefore, it is possible to cause all of the flexible members 51 to 56 to smoothly move without interference with each other. In addition, it is possible to save time and effort to adjust the lengths of the flexible members 51 to 56, in advance, before the bundle is attached to the outer circumference of the frame 332.

In addition, in the embodiment, since the bundle 5 is twisted by 180° in the first state, it is possible for the flexible members 51 to 56 to smoothly move without interference with each other. However, the bundle 5 may not be twisted by 180°, and may be twisted, preferably, in a range of 150° to 210°, and, more preferably, in a range of 160° to 200°. Within these ranges, it is possible to sufficiently achieve the effects that it is possible for the flexible members 51 to 56 to smoothly move without interference with each other.

In addition, as described above, the drive unit 312 as the member is provided with the motor 312M as the actuator that causes the second arm 12 as the (n+1)-th arm to move with respect to the first arm 11 as the n-th arm. The motor 312M is provided in the frame 332 included in the drive unit 312. The bundle 5 is disposed to have the U shape using the outer circumferential portion of the frame 332 inside which the motor 312M is provided, and thereby it is possible to reduce twisting or breaking of the flexible members 51 to 56 included in the bundle 5 which is shifted depending on the drive of the motor 312M.

In addition, as described above, in the robot 1 of the embodiment, the first arm 11 as the n-th arm is capable of rotating around the first rotation axis O1 as the n-th rotation axis, the second arm 12 as the (n+1)-th arm is provided on the first arm 11 and is capable of rotating around the second rotation axis O2 as the (n+1)-th rotation axis having an axial direction different from the axial direction of the first rotation axis O1. When viewed in the axial direction of the second rotation axis O2, it is possible to overlap the first arm 11 and the second arm 12. In this manner, it is possible to reduce a space in which the robot 1 is prevented from interference. In addition, in the robot 1 that includes the robotic arm 10 (manipulator) having such a configuration, in a state in which the first arm 11 and the second arm 12 overlap each other, when viewed in the axial direction of the second rotation axis O2, a space between the first arm 11 and the second arm 12 is relatively narrow. In the robot 1, when the folded portion 503b is provided in the bundle 5, and the flexible members 51 to 56 are disposed as illustrated in FIG. 9, this is particularly effective in that the flexible members 51 to 56 smoothly move without interference with each other.

In addition, as described above, the robot 1 includes the base 110, and the first arm 11 is provided on the base 110. In this manner, it is possible for the first arm 11 to rotate with respect to the base 110. In addition, as described above, the bundle 5 is folded in a twisted state even around the outer circumference of the frame 331 provided between the flange 1105 included in the base 110 and the flange 115 included in the first arm 11. The flexible members 51 to 56 are disposed around the frame 331 as illustrated in FIG. 9. Therefore, it is possible for the flexible members 51 to 56 to smoothly move without interference with each other even in the vicinity of the frame 331, and it is possible to reduce a possibility of breaking or the like of the plurality of flexible members 51 to 56.

The robot system 100 as an example of the robot system according to the invention described above includes the robot 1 and the control device 8 that controls the actuation of the robot 1. Since the robot 1 includes the bundle 5 which is characterized by the layout of the flexible members 51 to 56 as described above, it is possible for the flexible members 51 to 56 to smoothly move, and it is possible to reduce the possibility of breaking of the flexible members 51 to 56 due to the bending or tension thereof. Therefore, according to the robot system 100 that includes the robot 1, it is possible to reduce the possibility of breaking or the like of the plurality of flexible members 51 to 56, and thereby it is possible to provide the highly reliable robot system 100.

Second Embodiment

Figure 13:
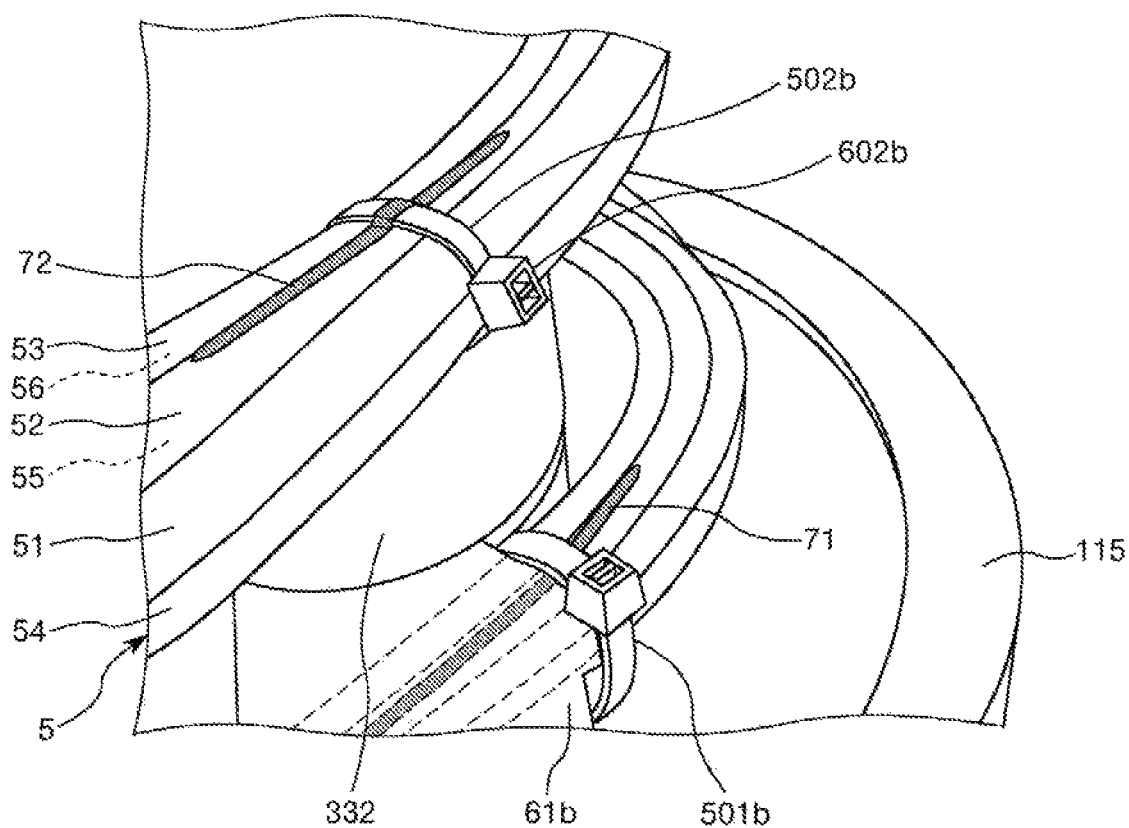
FIG. 13 is a view illustrating a bundle of flexible members provided in a robot according to a second embodiment of the invention.
Figure 14:
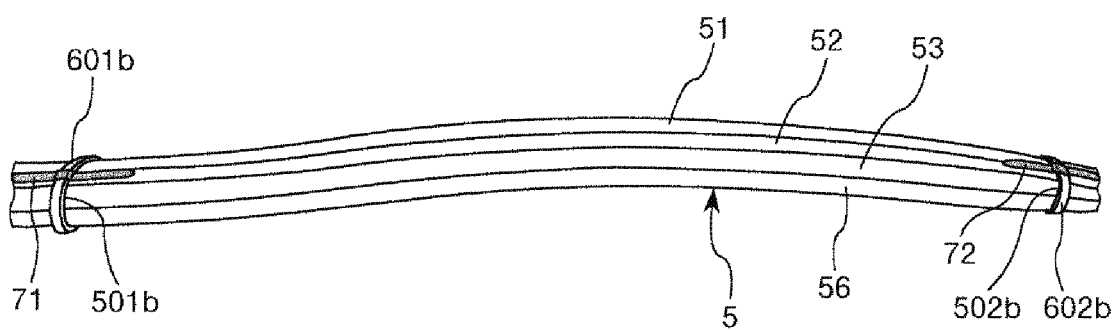
FIG. 14 is a view for illustrating arrangement of identification marks provided on the bundle of flexible members illustrated in FIG. 13.

FIG. 13 is a view illustrating the bundle of flexible members provided in the robot according to a second embodiment of the invention. FIG. 14 is a view for illustrating arrangement of identification marks provided on the bundle of flexible members illustrated in FIG. 13.

Hereinafter, the second embodiment is described by focusing on differences from the first embodiment described above, and the same description is omitted. Note that the flange 125 is omitted in FIG. 13. The bundle 5 illustrated in FIG. 14 is in a state (state before being attached) in which attachment to the frame 332 is not performed.

Identification marks 71 and 72 for identifying the external appearance of the flexible member 52 and the external appearances of the other flexible members 51 and 53 to 56 are attached on the flexible member 52 included in the bundle 5 illustrated in FIG. 13. As illustrated in FIG. 14, the identification mark 71 is attached to the binding member 601b (first fixed portion 501b) and in the vicinity thereof. The identification mark 72 is attached to the binding member 602b (second fixed portion 502b) and in the vicinity thereof. The identification marks 71 and 72 are linear marks attached to the flexible member 52 in the longitudinal direction. For example, in a case where the flexible members 51 to 56 have black external appearances, the identification marks 71 and 72 have a color (for example, red) which is different from the external appearances of the flexible members 51 to 56.

As illustrated in FIG. 14, the identification marks 71 and 72 are attached at positions at which both marks are visually recognizable from a predetermined direction side in a state in which the bundle 5 is attached on the outer circumference of the frame 332. In this state, when the bundle 5 is twisted by 180° and is attached to the outer circumference of the frame 332 to form the U shape in the twisted state, as illustrated in FIG. 13, it is possible to visually recognize both of the identification marks 71 and 72 simultaneously from the predetermined direction side. In this manner, it is possible to easily check that the bundle 5 is attached to the frame 332 in a state of being twisted by 180°. Therefore, the attachment of the identification marks 71 and 72 is particularly effective in a case where it is difficult to distinguish between the flexible members because the flexible members 51 to 56 have substantially the same external appearances, and it is difficult to check a twisted angle or whether or not the bundle 5 is twisted between the first fixed portion 501b and the second fixed portion 502b.

As described above, in the embodiment, it is possible to identify at least a part of the external appearance of the flexible member 52 and at least a part of the external appearances of the other flexible members 51 and 53 to 56. In this manner, it is possible to easily know the layout of the one flexible member 52 of the flexible members 51 to 56, and thereby it is possible to easily know that the bundle 5 is twisted, and further the twisted angle. In the embodiment, the flexible member 52 corresponds to the "first flexible member", and the flexible member 56 corresponds to the "second flexible member".

In addition, as described above, in the embodiment, the identification marks 71 and 72 used for identifying the flexible member 52 and the other flexible members 51 and 53 to 56 are attached to at least one flexible member 52 of the flexible members 51 to 56. In this manner, it is possible to easily distinguish visually between the flexible member 52 and the flexible members 51 and 53 to 56 by visually recognizing the identification marks 71 and 72. Therefore, it is possible to easily know that the bundle 5 is twisted.

In particular, as described above, the attachment of the identification marks 71 and 72 enables to identify the external appearance in the portion of the flexible member 52, which is fixed to the flange 116 included in the first arm 11, and the external appearances in the portions of the other flexible members 51 and 53 to 56, which are fixed to the flange 116. Moreover, it is possible to identify the external appearance in the portion of the flexible member 52, which is fixed to the flange 125 included in the second arm 12, and the external appearances in the portions of the other flexible members 51 and 53 to 56, which are fixed to the flange 125. In this manner, it is possible to easily know positions of the flexible member 52 in the first fixed portion 501b and the second fixed portion 502b. Therefore, it is possible to easily know that the bundle 5 is twisted, and further the twisted angle, by knowing the position of the flexible member 52 in the first fixed portion 501b and the second fixed portion 502b. In addition, the flexible member 52 and the other flexible members 51 and 53 to 56 are identified by attaching the identification marks 71 and 72 to the portions of the flexible member 52, and thereby it is possible to save time and effort to plan a configuration in which all of the flexible members 51 to 56 are identifiable and convenience is achieved.

Note that a method of identifying the flexible member 51 and the other flexible member 52 to 56 is not limited to the method of providing the identification marks 71 and 72. For example, the color of at least one external appearance (for example, the tube that covers the wiring) of the flexible members 51 to 56 may be changed. In other words, as long as it is possible to identify at least one external appearance of the flexible members 51 to 56, any identification method may be employed.

In addition, in the embodiment, the identification marks 71 and 72 are attached to the flexible member 52; however, the identification marks 71 and 72 may be attached to the other flexible members 51 and 53 to 56, or may be attached to two or more members of the flexible members 51 to 56.

As described above, the robot, the control device, and the robot system according to the invention are described on the basis of the embodiments in the figures; however, the invention is not limited thereto, and it is possible to replace the configurations of the members with any configurations having the same functions. In addition, another component may be attached. In addition, the invention may be embodied as a combination of two or more configurations (characteristics) of the embodiments described above.

In addition, in the embodiments described above, the robotic arm included in the robot has six rotating axes; however, the invention is not limited thereto, and the robotic arm may have, for example, two, three, four, five, seven, or more rotating axes. In addition, in the embodiments described above, the robot has six arms; however, the invention is not limited thereto, and the robot may have, for example, two, three, four, five, seven, or more arms.

In addition, in the embodiments described above, the robot has one robotic arm; however, the invention is not limited thereto, and the robot may have, for example, two or more robotic arms. In other words, the robot may be a multi-arm robot such as a double-arm robot.

In addition, in the embodiments described above, in a condition (relationship) between the n-th rotation axis, the n-th arm, the (n+1)-th rotation axis, and the (n+1)-th arm, a case where n is 1, that is, a case where the condition is satisfied in the first rotation axis, the first arm, the second rotation axis, and the second arm is described; however, the invention is not limited thereto, when n is an integer of 1 or larger, the same condition as the case where n is 1 may be satisfied when n is any integer of 1 or larger. Hence, for example, when n is 2, that is, in the second rotation axis, the second arm, the third rotation axis, and the third arm, the same condition as the case where n is 1 may be satisfied. In addition, when n is 3, that is, in the third rotation axis, the third arm, the fourth rotation axis, and the fourth arm, the same condition as the case where n is 1 may be satisfied. Further, when n is 4, that is, in the fourth rotation axis, the fourth arm, the fifth rotation axis, and the fifth arm, the same condition as the case where n is 1 may be satisfied. Furthermore, when n is 5, that is, in the fifth rotation axis, the fifth arm, the sixth rotation axis, and the sixth arm, the same condition as the case where n is 1 may be satisfied.

The entire disclosure of Japanese Patent Application No. 2016-129272, filed Jun. 29, 2016 is expressly incorporated by reference herein.

What is claimed is:

1. A robot comprising:
a first arm;
a second arm that is rotatably provided on the first arm;
a member provided between the first arm and the second arm;
a first flexible member that has at least one of wiring and a tube cluster; and
a second flexible member that has at least one of wiring and a tube cluster,
wherein each of the first flexible member and the second flexible member has a portion fixed to the first arm, a portion fixed to the second arm, and a portion that is positioned between the first arm and the second arm and is wound around the member in a folded state,
wherein the portion of the first flexible member that is fixed to the first arm is positioned on the member side from the portion of the second flexible member that is fixed to the first arm, and
wherein the portion of the second flexible member that is fixed to the second arm is positioned on the member side from the portion of the first flexible member that is fixed to the second arm.

2. The robot according to claim 1, further comprising:
a bundle of flexible members that includes the first flexible member and the second flexible member,
wherein the bundle has a first fixed portion fixed to the first arm, a second fixed portion fixed to the second arm, and a folded portion that is positioned between the first arm and the second arm and is wound around the member in a folded state, and
wherein the bundle is twisted between the first fixed portion and the second fixed portion.

3. The robot according to claim 2,
wherein the bundle of the flexible members is twisted in a range of 150° to 210°.

4. The robot according to claim 1,
wherein the member is provided with an actuator that causes the second arm to rotate with respect to the first arm.

5. The robot according to claim 1,
wherein at least a part of the external appearance of the first flexible member and at least a part of the external appearance of the second flexible member are identifiable.

6. The robot according to claim 5,
wherein a portion of the external appearance of the first flexible member that is fixed to the first arm and a portion of the external appearance of the second flexible member that is fixed to the first arm are identifiable, and a portion of the external appearance of the first flexible member that is fixed to the second arm and a portion of the external appearance of the second flexible member that is fixed to the second arm are identifiable.

7. The robot according to claim 1,
wherein at least one of the first flexible member and the second flexible member is provided with an identification mark for identifying the first flexible member and the second flexible member.

8. The robot according to claim 1,
wherein the first arm is capable of rotating around the first rotation axis, wherein the second arm is provided on the first arm so as to be capable of rotating around the second rotation axis having an axial direction which is different from an axial direction of the first rotation axis, and
wherein it is possible to overlap the first arm and the second arm, when viewed in the axial direction of the second rotation axis.

9. The robot according to claim 8,
wherein the first arm is longer than the second arm in length, when viewed in the axial direction of the second rotation axis.

10. The robot according to claim 1, further comprising:
a base,
wherein the first arm is provided on the base.

11. A control device, and
wherein actuation of the robot according to claim 1 is controlled.

12. A control device, and
wherein actuation of the robot according to claim 2 is controlled.

13. A control device, and
wherein actuation of the robot according to claim 3 is controlled.

14. A control device, and
wherein actuation of the robot according to claim 4 is controlled.

15. A control device, and
wherein actuation of the robot according to claim 5 is controlled.

16. A robot system comprising:
the robot according to claim 1; and
a control device that controls actuation of the robot.

17. A robot system comprising:
the robot according to claim 2; and
a control device that controls actuation of the robot.

18. A robot system comprising:
the robot according to claim 3; and
a control device that controls actuation of the robot.

19. A robot system comprising:
the robot according to claim 4; and
a control device that controls actuation of the robot.

20. A robot system comprising:
the robot according to claim 5; and
a control device that controls actuation of the robot.

* * * * *